(12) United States Patent
Eshima

(10) Patent No.: US 11,921,503 B2
(45) Date of Patent: Mar. 5, 2024

(54) AUTOMATIC PARKING SYSTEM

(71) Applicant: Toyota Jidosha Kabushiki Kaisha, Toyota (JP)

(72) Inventor: Kazuhito Eshima, Fuji (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 443 days.

(21) Appl. No.: 17/113,718

(22) Filed: Dec. 7, 2020

(65) Prior Publication Data

US 2021/0181743 A1  Jun. 17, 2021

(30) Foreign Application Priority Data

Dec. 13, 2019 (JP) .................. 2019-225194

(51) Int. Cl.
G05D 1/00 (2006.01)
G05D 1/02 (2020.01)

(52) U.S. Cl.
CPC ......... *G05D 1/0088* (2013.01); *G05D 1/0217* (2013.01); *G05D 2201/0213* (2013.01)

(58) Field of Classification Search
CPC .............. G05D 1/0088; G05D 1/0217; G05D 2201/0213; G08G 1/202
See application file for complete search history.

(56) References Cited

U.S. PATENT DOCUMENTS

| 5,113,427 A | 5/1992 | Ryoichi et al. | |
| 11,447,016 B2 * | 9/2022 | Barker | B60W 30/18127 |
| 2009/0066132 A1 | 3/2009 | Matsumoto et al. | |
| 2015/0346727 A1 * | 12/2015 | Ramanujam | G05D 1/0088 701/23 |
| 2018/0012156 A1 | 1/2018 | Voelz et al. | |
| 2018/0236889 A1 | 8/2018 | Masuda | |
| 2019/0101918 A1 * | 4/2019 | Mukaiyama | G06Q 10/00 |
| 2020/0198620 A1 * | 6/2020 | Nakata | B60W 60/0053 |
| 2022/0185340 A1 * | 6/2022 | Hidaka | G08G 1/14 |

FOREIGN PATENT DOCUMENTS

| EP | 3764336 A1 | 1/2021 |
| JP | S63246069 A | 10/1988 |
| JP | 2007-269268 A | 10/2007 |
| JP | 2009-067200 A | 4/2009 |
| JP | 2018137939 A | 8/2018 |
| JP | 2018-156641 A | 10/2018 |
| JP | 2019-067200 A | 4/2019 |

* cited by examiner

*Primary Examiner* — Jonathan L Sample
*Assistant Examiner* — Mohammed Yousef Abuelhawa
(74) *Attorney, Agent, or Firm* — Dinsmore & Shohl LLP

(57) ABSTRACT

An automatic parking system configured to cause an autonomous vehicle to travel autonomously from a parking space to a pickup area based on a parking space departure time determined such that the autonomous vehicle arrives the pickup area at a scheduled pickup time that is predetermined. The automatic parking system includes an on-control time setting unit configured to set an on-control time at which a state of the autonomous vehicle is controlled to be a power-on state based on the parking space departure time, and a power-on control unit configured to control the state of the autonomous vehicle to be the power-on state based on the on-control time that is set. The on-control time setting unit is configured to set the on-control time such that the power-on state is established prior to the parking space departure time.

10 Claims, 4 Drawing Sheets

AUTOMATIC PARKING SYSTEM

CROSS REFERENCE TO RELATED APPLICATION

This application claims priority to Japanese Patent Application No. 2019-225194 filed on Dec. 13, 2019, the contents of which are incorporated herein by reference in its entirety.

BACKGROUND

1. Technical Field

The disclosure relates to automatic parking systems.

2. Description of Related Art

For example, Japanese Unexamined Patent Application Publication No. 2009-067200 (JP 2009-067200 A) is known as a technical document relating to an automatic parking system. The technical document above describes that an autonomous vehicle is caused to autonomously travel from a parking space toward a pickup area based on an instruction to leave the parking space.

SUMMARY

Here, when departing from the parking space toward the pickup area, the autonomous vehicle may require some time to prepare for departure such as charging of a backup power source for a brake. Therefore, in the automatic parking system, it may be difficult to cause the autonomous vehicle to smoothly depart from the parking space toward the pickup area.

A first aspect of the disclosure is an automatic parking system configured to cause an autonomous vehicle to travel autonomously from a parking space to a pickup area based on a parking space departure time determined such that the autonomous vehicle arrives the pickup area at a scheduled pickup time that is predetermined. The automatic parking system includes an on-control time setting unit and a power-on control unit. The on-control time setting unit is configured to set an on-control time for controlling a state of the autonomous vehicle to be a power-on state based on the parking space departure time. The power-on control unit is configured to control the state of the autonomous vehicle to be the power-on state based on the on-control time that is set. The on-control time setting unit is configured to set the on-control time such that the power-on state is established prior to the parking space departure time.

In the first aspect above, the autonomous vehicle is controlled to establish the power-on state prior to the parking space departure time. With the configuration above, the autonomous vehicle can start departure preparation prior to the parking space departure time as the power-on state of the autonomous vehicle is established. Therefore, according to the first aspect above, the automatic parking system can suppress a delay in the departure of the autonomous vehicle from the parking space departure time due to causing the autonomous vehicle to stand by until the departure preparation is completed, and can cause the autonomous vehicle to depart smoothly from the parking space to the pickup area.

In the first aspect above, the automatic parking system may further include a preparation time determination unit configured to determine a departure preparation required time required for the autonomous vehicle to perform departure preparation. The on-control time setting unit may be configured to set the on-control time based on the parking space departure time and the departure preparation required time.

With the configuration above, the automatic parking system can appropriately set the on-control time at which the power-on state of the autonomous vehicle is established based on the departure preparation required time required for the departure preparation. Accordingly, the automatic parking system can cause the autonomous vehicle to depart more smoothly.

In the first aspect above, the on-control time setting unit may be configured to set, as the on-control time, a time prior to the parking space departure time by a time corresponding to the departure preparation required time.

With the configuration above, the autonomous vehicle can complete the departure preparation more reliably prior to the parking space departure time and can depart from the parking space at the parking space departure time. Accordingly, the automatic parking system can cause the autonomous vehicle to depart more smoothly.

In the first aspect above, the autonomous vehicle may be configured to perform a plurality of departure preparation processing items as the departure preparation. The preparation time determination unit may be configured to determine the departure preparation required time based on a longest individual preparation required time among the individual preparation required times required for preparation of the respective departure preparation processing items.

With the configuration above, even when there is the plurality of departure preparation items, the automatic parking system can set the on-control time based on the individual preparation required time that is longest among the individual preparation required times of the respective departure preparation items. For example, in the case where the departure preparation items can be executed in parallel when the autonomous vehicle is in the power-on state, the automatic parking system determines the longest individual preparation required time as the departure preparation required time such that extension of the departure preparation required time is suppressed and the departure preparation required time can be determined appropriately.

In the first aspect above, the autonomous vehicle may be configured to perform a plurality of departure preparation processing items as the departure preparation. The preparation time determination unit may be configured to determine the departure preparation required time based on a total time of individual preparation required times required for preparation of the respective departure preparation processing items.

With the configuration above, even when there is the plurality of departure preparation items, the automatic parking system can set the on-control time based on the total time of the individual preparation required times of the departure preparation items. For example, in the case where the departure preparation items cannot be executed in parallel when the autonomous vehicle is in the power-on state, the automatic parking system can secure the time for executing the departure preparation items individually as the departure preparation required time, which makes it possible to determine the departure preparation required time more appropriately.

A second aspect of the disclosure is an automatic parking system configured to cause an autonomous vehicle to travel autonomously from a parking space to a pickup area based on a parking space departure time determined such that the autonomous vehicle arrives the pickup area at a scheduled pickup time that is predetermined. The automatic parking system includes circuitry. The circuitry is configured to set an on-control time at which a state of the autonomous vehicle is controlled to be a power-on state based on the parking space departure time; set the on-control time such that the power-on state is established prior to the parking space departure time, and control the state of the autonomous vehicle to be the power-on state based on the on-control time that is set.

In the second aspect above, the circuitry may be configured to determine a departure preparation required time required for the autonomous vehicle to perform departure preparation, and set the on-control time based on the parking space departure time and the departure preparation required time.

In the second aspect above, the circuitry may be configured to set, as the on-control time, a time prior to the parking space departure time by a time corresponding to the departure preparation required time.

In the second aspect above, the autonomous vehicle may be configured to perform a plurality of departure preparation processing items as the departure preparation. The circuitry may be configured to determine an individual preparation required time that is a longest individual preparation required time among individual preparation required times required for preparation of the respective departure preparation processing items.

In the second aspect above, the autonomous vehicle may be configured to perform a plurality of departure preparation processing items as the departure preparation. The circuitry may be configured to determine the departure preparation required time based on a total time of individual preparation required times required for preparation of the respective departure preparation processing items.

According to the first and the second aspects of the disclosure, the autonomous driving vehicle can be smoothly departed from the parking space toward the pickup area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the drawings. In the following description, the same or corresponding elements will be denoted by the same reference symbols, without redundant description.

Figure 1:
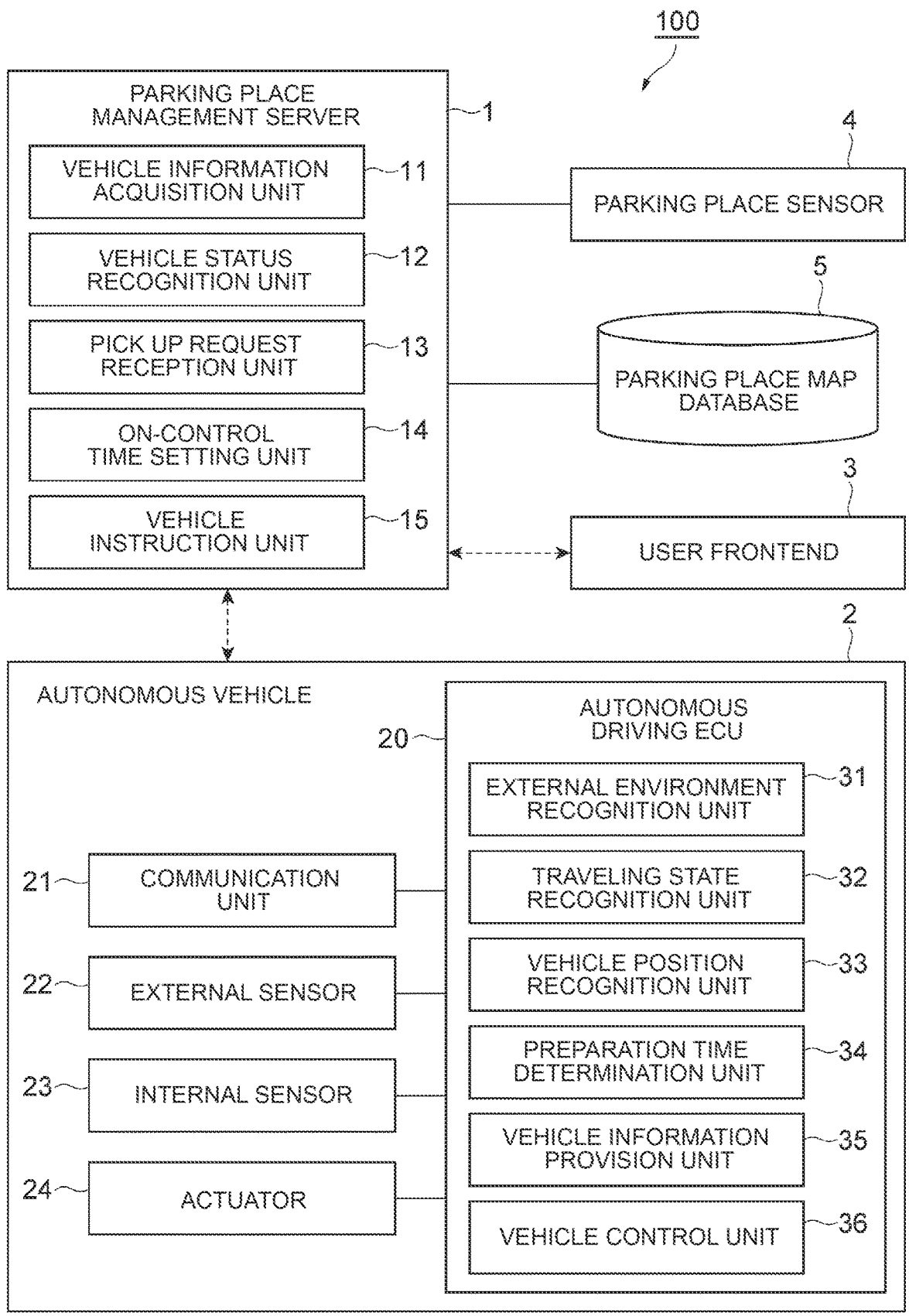
FIG. 1 is a block diagram showing an example of an automatic parking system according to an embodiment.

FIG. 1 is a block diagram showing the automatic parking system 100 according to an embodiment. An automated valet parking system (AVPS) 100 shown in FIG. 1 is a system for performing automatic valet parking of a plurality of autonomous vehicles 2 in a parking place.

The automatic valet parking is a service that the autonomous vehicle 2 with no occupant on board after a user (occupant) gets off the autonomous vehicle 2 at a drop-off area in the parking place is caused to travel along a target route in accordance with an instruction from the parking place side and to be automatically parked in a target parking space in the parking place. The target parking space is a parking space that is preset as a parking position of the autonomous vehicle 2. The target route is a route in the parking place along which the autonomous vehicle 2 travels to reach the target parking space. The target route at the time of leaving the parking space is a route along which the autonomous vehicle 2 travels to reach a pickup space to be described later.

The parking place may be a dedicated parking place for automatic valet parking, or may be a parking place for general vehicles that are not covered by automatic valet parking. A part of the parking place for general vehicles may be used as an area dedicated to the automatic valet parking. In the embodiment, the parking place dedicated to the automatic valet parking is used as an example for description.

Figure 2:
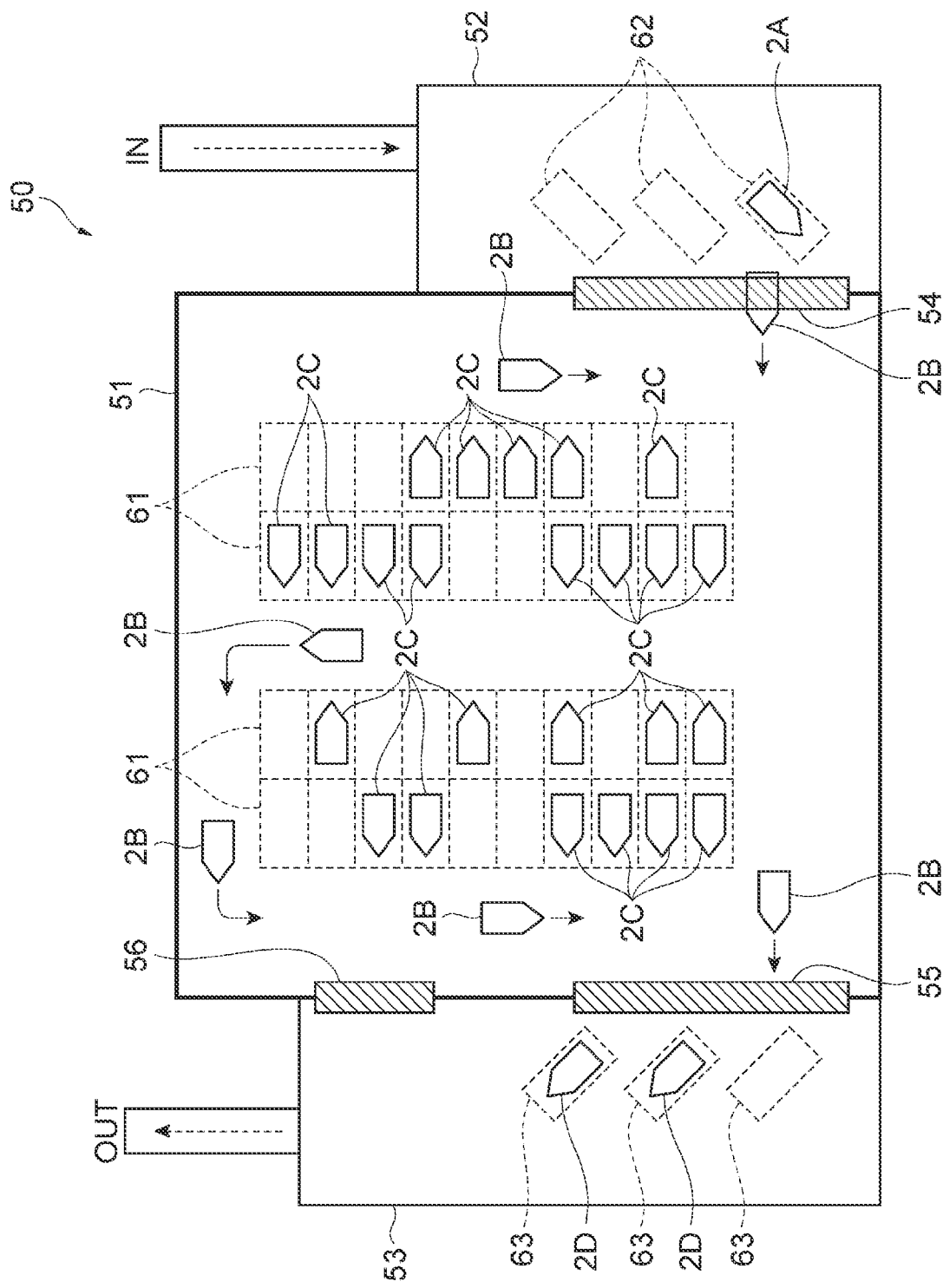
FIG. 2 is a plan view showing an example of a parking place where an automatic valet parking is performed.

Here, FIG. 2 is a plan view showing an example of a parking place where the automatic valet parking is performed. FIG. 2 shows a parking place 50 for the automatic valet parking, a parking area 51, a drop-off area 52, and a pickup area 53. The parking place 50 includes the parking area 51, the drop-off area 52, and the pickup area 53.

The parking area 51 is an area where a parking space (parking frame) 61 in which the autonomous vehicle 2 is parked by the automatic valet parking is provided. A plurality of the parking spaces 61 is provided adjacent to each other in one direction (e.g. a vehicle width direction of vehicles to be parked) as shown in FIG. 2.

The drop-off area 52 is provided on the entrance side of the parking place 50, and is a place for occupants including the user to get off from the autonomous vehicle 2 before entering the parking place 50. In the drop-off area 52, a drop-off space 62 for stopping the autonomous vehicle 2 when the occupants get off is provided. The drop-off area 52 leads to the parking area 51 via an entrance gate 54.

The pickup area 53 is provided on the exit side of the parking place 50 and is a place for occupants to board the autonomous vehicle 2 that has left the parking space. The pickup area 53 includes a pickup space 63 where the autonomous vehicle 2 stands by for occupants to board. The pickup area 53 leads to the parking area 51 via an exit gate 55. Further, a return gate 56 for returning the autonomous vehicle 2 from the pickup area 53 to the parking area 51 is provided between the pickup area 53 and the parking area 51. The return gate 56 is not essential.

Further, FIG. 2 shows an autonomous vehicle 2A stopped in the drop-off space 62 in the drop-off area 52, autonomous vehicles 2B traveling in the parking place 50, and autonomous vehicles 2C parked in the respective parking spaces 61 in the parking area 51, and autonomous vehicles 2D stopped in the respective pickup spaces 63 in the pickup area 53.

The automatic parking system 100 starts the automatic valet parking while obtaining an authority to issue an instruction to the autonomous vehicle 2 after, for example, the autonomous vehicle 2 enters the parking place 50 and the occupants get off from the autonomous vehicle 2 in the drop-off space 62 (this case corresponds to the autonomous vehicle 2A). The automatic parking system 100 causes the autonomous vehicle 2 to travel toward the target parking space in the parking area 51 (this case corresponds to the autonomous vehicle 2B), and parks the autonomous vehicle 2 in the target parking space (this case corresponds to the autonomous vehicle 2C). The automatic parking system 100 causes the parked autonomous vehicle 2 to travel toward the pickup area 53 in response to a pickup request, and causes the autonomous vehicle 2 to stand by in the pickup space 63 until the occupants arrive (this case corresponds to the autonomous vehicle 2D).

Configuration of Automatic Parking System

Hereinafter, a configuration of the automatic parking system 100 will be described with reference to the drawings. As shown in FIG. 1, the automatic parking system 100 includes a parking place management server 1. The parking place management server 1 is a server for managing the parking place.

The parking place management server 1 is configured to be communicable with the autonomous vehicles 2 and a user frontend 3. The autonomous vehicle 2 and the user frontend 3 will be described later in detail. The parking place management server 1 may be provided in the parking place or in a facility apart from the parking place. The parking place management server 1 may be configured of a plurality of computers provided in different places.

The parking place management server 1 is connected to a parking place sensor 4 and a parking place map database 5. The parking place sensor 4 is a sensor for recognizing a status in the parking place 50. The parking place sensor 4 includes a vacancy sensor for detecting whether there is a parked vehicle in each parking space (whether each parking space is occupied or vacant).

The vacancy sensor may be provided for each parking space, or may be provided on, for example, a ceiling such that a plurality of parking spaces can be monitored by one unit. The configuration of the vacancy sensor is not particularly limited, and a configuration of a related art may be adopted as the vacancy sensor. The vacancy sensor may be a pressure sensor, a radar sensor that uses radio waves or a sonar sensor, or a camera. The vacancy sensor transmits the detection information of the parked vehicle in the parking space to the parking place management server 1.

The parking place sensor 4 may include a surveillance camera for detecting the autonomous vehicle 2 that travels along a traveling route in the parking place 50. The surveillance camera is provided on the ceiling or a wall of the parking place, and captures an image of the autonomous vehicle 2 that is traveling. The surveillance camera transmits the captured image to the parking place management server 1.

A parking place map database 5 is a database that stores parking place map information. The parking place map information includes positional information of the parking spaces, positional information of the drop-off spaces, positional information of the pickup spaces, and the traveling route in the parking place. Further, the parking place map information includes positional information of a landmark that is used for the autonomous vehicle 2 to perform position recognition. The landmark will be described later.

Figure 3:
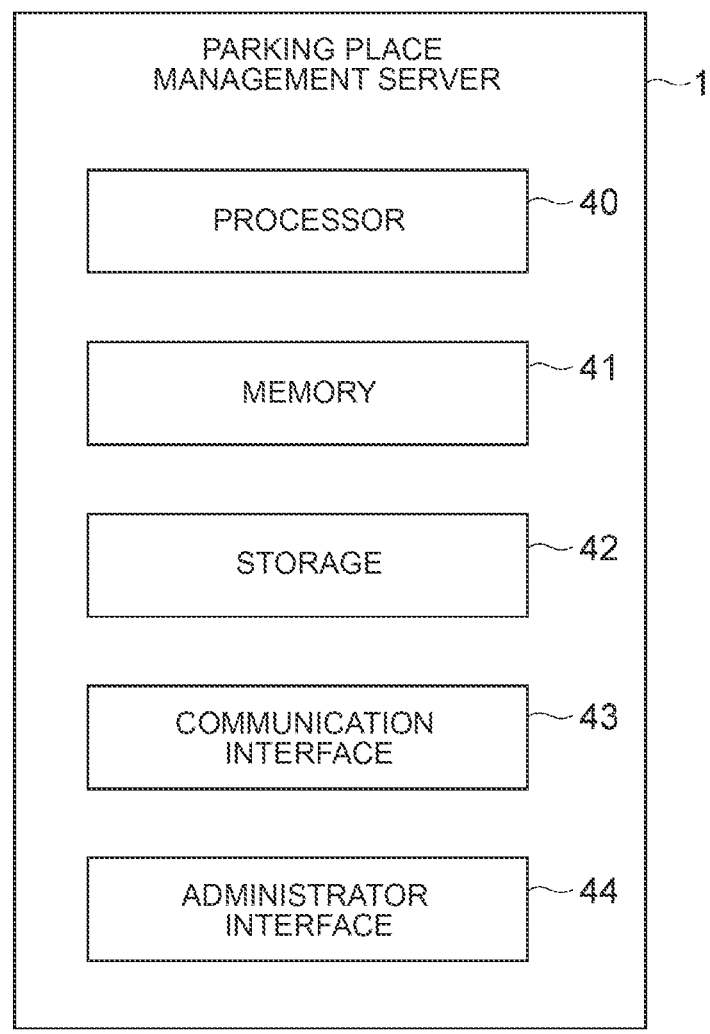
FIG. 3 is a block diagram showing an example of a hardware configuration of a parking place management server.

Next, a hardware configuration of the parking place management server 1 will be described. FIG. 3 is a block diagram showing an example of the hardware configuration of the parking place management server 1. As shown in FIG. 3, the parking place management server 1 is configured as a general computer including a processor 40, a memory 41, a storage 42, a communication interface 43, and an administrator interface 44.

The processor 40 operates various operating systems to control the parking place management server 1. The processor 40 is a computing unit such as a central processing unit (CPU) including a control device, a computing device, and a register, for example. The processor 40 controls the memory 41, the storage 42, the communication interface 43, and the administrator interface 44. The memory 41 is a recording medium such as a read only memory (ROM) or a random access memory (RAM). The storage 42 is a recording medium such as a hard disk drive (HDD).

The communication interface 43 is a communication device for performing wireless communication via a network. A network device, a network circuitry or a network card, for example, may be used as the communication interface 43. The parking place management server 1 communicates with the autonomous vehicle 2 and the user frontend 3 using the communication interface 43. The administrator interface 44 is an input and output unit of the parking place management server 1 for an administrator of the parking place management server 1, etc. The administrator interface 44 includes an output device such as a display and a speaker, and an input device such as a touch panel.

Next, a functional configuration of the parking place management server 1 will be described. As shown in FIG. 1, the parking place management server 1 includes a vehicle information acquisition unit 11, a vehicle status recognition unit 12, a pickup request reception unit 13, an on-control time setting unit 14, and a vehicle instruction unit 15.

The vehicle information acquisition unit 11 acquires vehicle information of the autonomous vehicle 2 through communication with the autonomous vehicle 2 to be parked by the automatic valet parking. The vehicle information includes identification information of the autonomous vehicle 2 and positional information of the autonomous vehicle 2 in the parking place. The identification information may be any information as long as each autonomous vehicle 2 can be identified with the identification information. The identification information may be an identification (ID) number, a vehicle number, and a reservation number for the automatic valet parking, etc.

The vehicle information may include a vehicle type of the autonomous vehicle 2, or may include the vehicle number separately from the identification information. The vehicle information may include vehicle body information such as a turning radius and a vehicle width of the autonomous vehicle 2, or may include information regarding an autonomous driving function of the autonomous vehicle 2. The information on the autonomous driving function may include version information on the autonomous driving.

The vehicle information may include recognition results of a traveling state and an external environment of the autonomous vehicle 2. Recognition of the traveling state and the external environment will be described later. The vehicle information may include information on a remaining travelable distance or a remaining fuel of the autonomous vehicle 2. The vehicle information may include failure information of the autonomous vehicle 2. The failure information is information regarding a vehicle abnormality that has occurred in the autonomous vehicle 2. The vehicle information acquisition unit 11 continuously acquires the vehicle information from the autonomous vehicle 2 during the automatic valet parking.

The vehicle status recognition unit 12 recognizes the status of the autonomous vehicle 2 during the automatic valet parking based on the vehicle information acquired by the vehicle information acquisition unit 11. The status of the autonomous vehicle 2 includes a position of the autonomous vehicle 2 in the parking place. The status of the autonomous vehicle 2 includes a status of the communication between the parking place management server 1 and the autonomous vehicle 2. The vehicle status recognition unit 12 may recognize the status of the autonomous vehicle 2 based on the captured image of the autonomous vehicle 2 transmitted from the parking place sensor 4.

The pickup request reception unit 13 receives a pickup request from the user. The pickup request from the user is made through the user frontend 3. The user frontend 3 can make the pickup request by long-distance communication or short-distance communication. The pickup request includes information to identify the autonomous vehicle 2 to leave the parking space in response to the pickup request. Further, the pickup request includes a scheduled pickup time at which the user receives the autonomous vehicle 2 in the pickup area 53. The scheduled pickup time is preset by the user. The user can input the scheduled pickup time in advance through the user frontend 3. As described above, the pickup request reception unit 13 can acquire the pickup request including the scheduled pickup time.

The on-control time setting unit 14 sets an on-control time for controlling (switching) a state of the autonomous vehicle 2 to be a power-on state. Here, the power-on state is a state in which each functional unit mounted on the autonomous vehicle 2 is operable. Specifically, for example, when the autonomous vehicle 2 is a vehicle equipped with an engine, the power-on state is a state in which an ignition switch is turned on. For example, when the autonomous vehicle 2 is an electric vehicle, the power-on state is a state in which each functional unit such as a motor is operable.

Specifically, the on-control time setting unit 14 first calculates a parking space departure time that is a time when the autonomous vehicle 2 parked in the parking space 61 departs from the parking space 61 toward the pickup area 53. The on-control time setting unit 14 calculates the parking space departure time such that the autonomous vehicle 2 can arrive the pickup space 63 in the pickup area 53 at the scheduled pickup time acquired by the pickup request reception unit 13.

Here, for example, the on-control time setting unit 14 calculates a traveling time required for the autonomous vehicle 2 to move from the parking space 61 where the autonomous vehicle 2 is parked to the pickup area 53 (pickup space 63) based on the position of the parking space 61 where the autonomous vehicle 2 is parked, a path (distance) from the parking space 61 where the autonomous vehicle 2 is parked to the pickup area 53 (pickup space 63), and a speed at which the autonomous vehicle 2 is caused to travel in the parking area 51. The on-control time setting unit 14 can calculate the parking space departure time based on the calculated traveling time and the scheduled pickup time.

Next, the on-control time setting unit 14 sets on-control time for controlling the state of the autonomous vehicle 2 to be the power-on state based on the calculated parking space departure time. Here, as will be described in detail later, departure preparation when the autonomous vehicle 2 departs from the parking space 61 to the pickup area 53 takes some time. Therefore, the on-control time setting unit 14 sets the on-control time such that the power-on state is established prior to the parking space departure time. As described above, the power-on state of the autonomous vehicle 2 is established prior to the parking space departure time. This makes it possible for the autonomous vehicle 2 to start the departure preparation prior to the parking space departure time.

Further, as will be described later in detail, the autonomous vehicle 2 transmits a departure preparation required time to the parking place management server 1. The departure preparation required time is a time required for the autonomous vehicle 2 to prepare for departure. Therefore, the on-control time setting unit 14 sets the on-control time based on the parking space departure time and the departure preparation required time. Specifically, the on-control time setting unit 14 can set the on-control time to a time prior to the parking space departure time by the time corresponding to the departure preparation required time.

The vehicle instruction unit 15 issues an instruction to the autonomous vehicle 2 for which the automatic valet parking is performed. The automatic valet parking of the autonomous vehicle 2 is performed as the vehicle instruction unit 15 issues an instruction on a target route having the parking space 61 or the pickup space 63 in the parking place 50 as a destination. The target route may be, for example, the shortest path from the current position of the autonomous vehicle 2 in the parking place 50 to the destination. In addition, the vehicle instruction unit 15 may instruct an upper limit vehicle speed and/or an upper limit acceleration in the parking place together with the target route. The upper limit vehicle speed and the upper limit acceleration are predetermined.

When the parking space departure time for the autonomous vehicle 2 that has received the pickup request is reached, the vehicle instruction unit 15 instructs the autonomous vehicle 2 to travel to the pickup space 63 (to start leaving the parking space). The vehicle instruction unit 15 instructs the target route from the current position of the autonomous vehicle 2 parked in the parking space 61 to the pickup space 63 that is vacant so as to cause the autonomous vehicle 2 to start leaving the parking space.

Further, when the on-control time set by the on-control time setting unit 14 is reached, the vehicle instruction unit 15 issues a power-on instruction to the autonomous vehicle 2 with which the on-control time is reached so as to control (switch) the state of the autonomous vehicle 2 to be the power-on state. The power-on instruction above is issued prior to the instruction to travel to the pickup space 63 described above.

Note that, the vehicle instruction unit 15 may instruct the on-control time to the autonomous vehicle 2 instead of the power-on instruction issued when the power-on time is reached. In this case, the vehicle instruction unit 15 needs to instruct the on-control time to the autonomous vehicle 2 prior to the on-control time.

Next, the autonomous vehicle 2 and the user frontend 3 that communicate with the parking place management server 1 will be described. The automatic parking system 100 according to the embodiment does not need to include the autonomous vehicle 2.

Structure of Autonomous Vehicle

As shown in FIG. 1, the autonomous vehicle 2 includes an autonomous driving ECU 20 as an example. The autonomous driving ECU 20 is an electronic control unit including a CPU, a ROM, and a RAM, etc. The autonomous driving ECU 20, for example, loads a program stored in the ROM into the RAM and causes the CPU to execute the program loaded in the RAM so as to realize various functions. The autonomous driving ECU 20 may be composed of a plurality of electronic units.

The autonomous driving ECU 20 is connected to the communication unit 21, the external sensor 22, the internal sensor 23, and the actuator 24.

The communication unit 21 is a communication device that controls wireless communication with the outside of the autonomous vehicle 2. The communication unit 21 transmits and receives various types of information via communication with the parking place management server 1. The communication unit 21 transmits, for example, the vehicle information to the parking place management server 1 and acquires information necessary for the automatic valet parking (for example, information on landmarks along the target route) from the parking place management server 1.

The external sensor 22 is a vehicle-mounted sensor that detects the external environment of the autonomous vehicle 2. The external sensor 22 includes at least a camera. The camera is an imaging device that captures images of the external environment of the autonomous vehicle 2. The camera is provided, for example, on the back side of a windshield of the autonomous vehicle 2 and captures images forward of the autonomous vehicle 2. The camera transmits captured image information regarding the external environment of the autonomous vehicle 2 to the autonomous driving ECU 20. The camera may be a monocular camera or a stereo camera. A plurality of the cameras may be provided, and may capture images on the right and left sides and rearward of the autonomous vehicle 2, in addition to the images forward of the autonomous vehicle 2.

The external sensor 22 may include a radar sensor. The radar sensor is a detection device that detects an object around the autonomous vehicle 2 using radio waves (e.g. millimeter waves) or light. The radar sensor includes, for example, a millimeter wave radar or a light detection and ranging (LIDAR) sensor. The radar sensor detects the object by transmitting an electric wave or light to the vicinity of the autonomous vehicle 2 and receiving the electric wave or the light reflected by the object. The radar sensor transmits the detected object information to the autonomous driving ECU 20. In addition, the external sensor 22 may include a sonar sensor that detects a sound outside the autonomous vehicle 2.

The internal sensor 23 is a vehicle-mounted sensor that detects a traveling state of the autonomous vehicle 2. The internal sensor 23 includes a vehicle speed sensor, an acceleration sensor, and a yaw rate sensor. The vehicle speed sensor is a detection device that detects the speed of the autonomous vehicle 2. A wheel speed sensor may be used as the vehicle speed sensor. The wheel speed sensor is provided for, for example, wheels of the autonomous vehicle 2 or a drive shaft that rotates integrally with the wheels, and that detects a rotational speed of each wheel. The vehicle speed sensor transmits the detected vehicle speed information (wheel speed information) to the autonomous driving ECU 20.

The acceleration sensor is a detection device that detects an acceleration of the autonomous vehicle 2. The acceleration sensor includes, for example, a longitudinal acceleration sensor that detects a longitudinal acceleration of the autonomous vehicle 2. The acceleration sensor may include a lateral acceleration sensor that detects a lateral acceleration of the autonomous vehicle 2. The acceleration sensor transmits, for example, acceleration information of the autonomous vehicle 2 to the autonomous driving ECU 20. The yaw rate sensor is a detection device that detects a yaw rate (rotational angular velocity) about a vertical axis of the center of gravity of the autonomous vehicle 2. A gyro sensor, for example, may be used as the yaw rate sensor. The yaw rate sensor transmits the detected yaw rate information of the autonomous vehicle 2 to the autonomous driving ECU 20.

An actuator 24 is a device used to control the autonomous vehicle 2. The actuator 24 includes at least a drive actuator, a brake actuator, and a steering actuator. The drive actuator controls a drive force of the autonomous vehicle 2 by controlling an amount of air to be supplied to the engine (throttle opening) in response to a control signal from the autonomous driving ECU 20. When the autonomous vehicle 2 is a hybrid vehicle, a control signal from the autonomous driving ECU 20 is input to a motor as a power source in addition to the amount of air supplied to the engine so as to control the drive force. When the autonomous vehicle 2 is an electric vehicle, a control signal from the autonomous driving ECU 20 is input to a motor as a power source so as to control the drive force. The motor as the power source in the cases above constitutes the actuator 24.

The brake actuator controls a braking system in accordance with the control signal from the autonomous driving ECU 20 and controls a braking force to be applied to the wheels of the autonomous vehicle 2. As the brake system, for example, a hydraulic brake system may be used. The steering actuator controls driving of an assist motor that controls a steering torque in an electric power steering system in accordance with a control signal from the autonomous driving ECU 20. As a result, the steering actuator controls the steering torque of the autonomous vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a preparation time determination unit 34, a vehicle information provision unit 35, and a vehicle control unit (power-on control unit) 36.

The external environment recognition unit 31 recognizes the external environment of the autonomous vehicle 2 based on the detection result of the external sensor 22 (the image captured by the camera or the object information detected by the radar sensor). The external environment includes relative positions of surrounding objects with respect to the autonomous vehicle 2. The external environment may include a relative speed and a moving direction of the surrounding objects with respect to the autonomous vehicle 2. The external environment recognition unit 31 recognizes an object such as a surrounding vehicle and a pillar of the parking place by pattern matching or the like. The external environment recognition unit 31 may recognize a gate of the parking place, a wall of the parking place, a pole, and a safety cone, etc. Further, the external environment recognition unit 31 may recognize driving boundaries in the parking place through recognition of lane marking lines.

The traveling state recognition unit 32 recognizes the traveling state of the autonomous vehicle 2 based on the detection result of the internal sensor 23. The traveling state includes the vehicle speed of the autonomous vehicle 2, the acceleration of the autonomous vehicle 2, and the yaw rate of the autonomous vehicle 2. Specifically, the traveling state recognition unit 32 recognizes the vehicle speed of the autonomous vehicle 2 based on the vehicle speed information of the vehicle speed sensor. The traveling state recognition unit 32 recognizes the acceleration of the autonomous vehicle 2 based on the vehicle speed information of the acceleration sensor. The traveling state recognition unit 32 recognizes a direction of the autonomous vehicle 2 based on the yaw rate information of the yaw rate sensor.

The vehicle position recognition unit 33 recognizes the position of the autonomous vehicle 2 in the parking place based on the parking place map information acquired from the parking place management server 1 through the communication unit 21 and the external environment recognized by the external environment recognition unit 31.

The vehicle position recognition unit 33 automatically detects the position of the autonomous vehicle 2 in the parking place included in the parking place map information and the relative position of the landmark in the parking place with respect to the autonomous vehicle 2 recognized by the external environment recognition unit 31. An object fixedly provided in the parking place may be used as the landmark. For example, at least one of the pillar and the wall of the parking place and a safety cone is used as the landmark. The driving boundaries may be used as the landmark.

In addition, the vehicle position recognition unit 33 may recognize the position of the autonomous vehicle 2 by dead reckoning based on the detection result of the internal sensor 23. In addition, the vehicle position recognition unit 33 may recognize the position of the autonomous vehicle 2 by communicating with a beacon provided in the parking place.

The preparation time determination unit 34 determines the departure preparation required time required for the autonomous vehicle 2 to prepare for departure. The departure preparation herein is a preparation for the autonomous vehicle 2 to depart for the pickup area 53 from the state in which the autonomous vehicle 2 is parked in the parking space 61. The contents of the departure preparation (departure preparation items) are set in advance.

Specifically, the departure preparation may include, for example, a charging process of the backup power supply for operating the brake of the autonomous vehicle 2. It is desirable to secure the backup power source for the brake as the departure preparation from the viewpoint that the autonomous vehicle 2 can be stopped more reliably when the autonomous vehicle 2 travels unmanned. In addition, the departure preparation may include, for example, a room temperature adjustment process to operate an air conditioner of the autonomous vehicle 2 so as to adjust a temperature in a vehicle cabin. When the autonomous vehicle 2 is equipped with the engine, the departure preparation may include, for example, a warm-up operation process to operate the engine for warm-up of the engine. In addition, the departure preparation may include various preparations for causing the autonomous vehicle 2 to depart.

As described above, the departure preparation includes a plurality of processing items such as the charging processing of the backup power source for the brake and the room temperature adjustment processing, which are described above. Hereinafter, the processing items executed as the departure preparation will be referred to as departure preparation items. Also, a time required to prepare for each of the departure preparation items is referred to as an individual preparation required time. The individual preparation required time may be determined in advance for each departure preparation item, or may be calculated based on calculation by a method of a related art.

The individual preparation required time when the departure preparation item is the charging process of the backup power supply for the brake, for example, a predetermined value may be used as the individual preparation required time, or the individual preparation required time may be calculated based on the remaining charge amount of the backup battery for the brake, etc. For the individual preparation required time when the departure preparation items are the room temperature adjustment processing and the warm-up operation processing, for example, a predetermined value may be used as the individual preparation required time, or the individual preparation required time may be calculated based on an outside temperature, etc.

The preparation time determination unit 34 determines the departure preparation required time based on each individual preparation required time required for preparation of the corresponding departure preparation item. Here, the preparation time determination unit 34 determines the departure preparation required time based on a longest among the individual preparation required times required for preparation of the respective departure preparation items.

In addition, for example, when the departure preparation items cannot be simultaneously executed in parallel, the preparation time determination unit 34 may determine the departure preparation required time based on the total time of the individual preparation required times of the departure preparation items. Whether each of the departure preparation items can be executed concurrently in parallel may be determined based on, for example, an amount of power consumption required to execute the departure preparation items. As an example, when it is intended to charge the power source having a large capacity as the departure preparation item despite the limited performance of a generator, the total time of the individual preparation required times of the departure preparation items may be determined as the departure preparation required time.

Furthermore, the preparation time determination unit 34 may determine the departure preparation required time in combination of the method of determining the longest individual preparation required time as the departure preparation required time and the method of determining the total time of the individual preparation required times as the departure preparation required time, which have been described above. In this case, for example, the preparation time determination unit 34 determines the total time of the individual preparation required time that is longest among the individual preparation required times of the departure preparation items that can be executed concurrently in parallel and the individual preparation required times of the departure preparation items that cannot be executed simultaneously with the other departure preparation items as the departure preparation required time.

The vehicle information provision unit 35 provides the parking place management server 1 with the vehicle information through the communication unit 21. The vehicle information provision unit 35 provides the parking place management server 1 with the vehicle information including information on the position of the autonomous vehicle 2 in the parking place recognized by the vehicle position recognition unit 33, for example, at regular time intervals.

When the vehicle abnormality is detected, the vehicle information provision unit 35 provides the parking place management server 1 with the vehicle information including the failure information regarding the vehicle abnormality. A method of detecting the vehicle abnormality (various failures) is not particularly limited, and a method of a related art may be adopted.

Further, the vehicle information provision unit 35 provides the parking place management server 1 with the departure preparation required time determined by the preparation time determination unit 34. The vehicle information provision unit 35 provides the parking place management server 1 with the departure preparation required time at an appropriate timing. For example, the vehicle information provision unit 35 can provide the departure preparation required time at a timing, for example, after the autonomous vehicle 2 enters the parking place 50 or after the autonomous vehicle 2 is parked in the parking space 61.

The vehicle control unit 36 controls an operation of each unit of the autonomous vehicle 2. When the vehicle control unit 36 receives the power-on instruction from the parking place management server 1 in the state in which the vehicle is parked in the parking space 61, the vehicle control unit 36 controls (switches) the state of the autonomous vehicle 2 to be the power-on state. As described above, the power-on instruction is transmitted based on the on-control time. That is, the vehicle control unit 36 controls the state of the autonomous vehicle 2 to be the power-on state based on the on-control time. When the on-control time is instructed to the autonomous vehicle 2 instead of the power-on instruction, the vehicle control unit 36 may control the state of the autonomous vehicle 2 to be the power-on state based on the on-control time (when the on-control time is reached). After controlling the state of the autonomous vehicle 2 to be the power-on state, the vehicle control unit 36 executes each departure preparation item and prepares for departure for the pickup area 53.

Further, the vehicle control unit 36 executes autonomous driving of the autonomous vehicle 2. In the autonomous driving, the autonomous vehicle 2 is caused to autonomously travel along the target route that is instructed by the parking place management server 1. The vehicle control unit 36 generates, for example, a trajectory of the autonomous vehicle 2 based on the target route, the position of the autonomous vehicle 2, the external environment of the autonomous vehicle 2, and the traveling state of the autonomous vehicle 2. The trajectory corresponds to a traveling plan for the autonomous driving. The trajectory includes a path along which the autonomous vehicle travels by the autonomous driving and a vehicle speed plan in the autonomous driving.

The path is a locus on which the autonomous vehicle that is autonomously traveling is scheduled to travel along the target route. The path may be, for example, data (steering angle plan) of a change in a steering angle of the autonomous vehicle 2 in accordance with the position on the target route. The position on the target route is, for example, a set vertical position set at predetermined intervals (for example, one meter) along the traveling direction in the target route. The steering angle plan is data in which a target steering angle is associated with each set vertical position.

The vehicle control unit 36 generates the trajectory such that the autonomous vehicle 2 travels to pass through the center of the traveling route in the parking place along the target route, for example. When there is an instruction on the upper limit vehicle speed sent from the parking place management server 1, the vehicle control unit 36 generates the trajectory such that the vehicle speed plan does not exceed the upper limit vehicle speed. The vehicle control unit 36 may generate the trajectory using the parking place map information acquired through communication with the parking place management server 1.

When the vehicle control unit 36 receives a stop instruction from the parking place management server 1, the vehicle control unit 36 stops the autonomous vehicle 2. When the vehicle control unit 36 receives a traveling instruction from the parking place management server 1, the vehicle control unit 36 starts the stopped autonomous vehicle 2. Although the example of the configuration of the autonomous vehicle 2 has been described above, the autonomous vehicle 2 is not limited to the example above as long as the autonomous vehicle 2 has a configuration in which the automatic valet parking can be realized.

Configuration of User Frontend

The user frontend 3 is an information terminal operated by the user. The user frontend 3 is configured by, for example, a computer including a processor such as a CPU, a memory such as a ROM or a RAM, a communication device, and a user interface including a display-touch panel.

The user frontend 3 has a function to issue a parking request and a pickup request to the parking place management server 1. The user can make the parking request and the pickup request for the automatic valet parking by operating the user frontend 3. The user can transmit the pickup request including the scheduled pickup time to the parking place management server 1 by operating the user frontend 3. With this configuration, the user can transmit the scheduled pickup time to the parking place management server 1 in advance. The parking place management server 1 can perform the on-control time setting process and issue the pickup instruction, etc., which are described above, based on the scheduled pickup time.

Processing of Automatic Parking System

Figure 4:
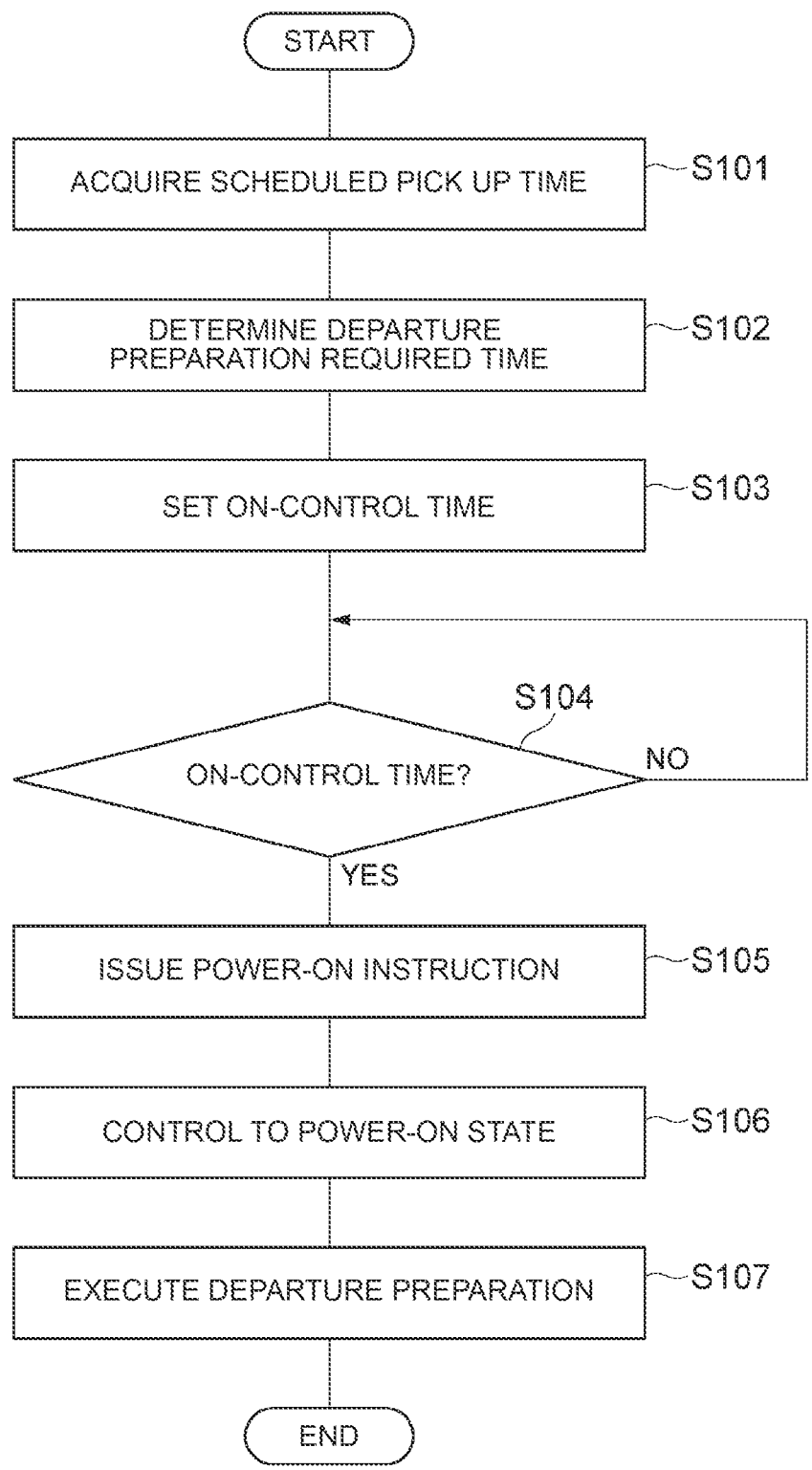
FIG. 4 is a flowchart showing an example of departure preparation start processing until an autonomous vehicle starts departure preparation for traveling to a pickup area.

Next, processing by the automatic parking system 100 will be described with reference to the drawings. FIG. 4 is a flowchart showing an example of departure preparation start processing from the state in which the autonomous vehicle 2 is parked in the parking space 61 to the state in which the autonomous vehicle 2 starts the departure preparation for the pickup area 53. Note that the departure preparation start processing is started in the state in which the autonomous vehicle 2 is parked in the parking space 61. Further, it is assumed that the autonomous vehicle 2 is in a power-off state before the departure preparation start processing is started. For example, when the autonomous vehicle 2 is a vehicle equipped with the engine, the power-off state is a state in which the ignition switch is turned off. For example, when the autonomous vehicle 2 is an electric vehicle, the power-off state is a state in which each functional unit such as a motor is not operable. However, even in the power-off state, the autonomous vehicle 2 is communicable with the parking place management server 1 and is controllable to establish the power-on state based on the power-on instruction from the parking place management server 1.

As shown in FIG. 4, the pickup request reception unit 13 of the parking place management server 1 acquires the scheduled pickup time that is set by the user in advance (S101). The preparation time determination unit 34 of the autonomous vehicle 2 determines the departure preparation required time required for the autonomous vehicle 2 to prepare for departure (S102). The on-control time setting unit 14 of the parking place management server 1 sets the on-control time for controlling the state of the autonomous vehicle 2 to be the power-on state (S103). Specifically, the on-control time setting unit 14 calculates a parking space departure time such that the autonomous vehicle 2 can arrive the pickup space 63 in the pickup area 53 at the acquired scheduled pickup time. Next, the on-control time setting unit 14 sets the on-control time based on the calculated parking space departure time and the determined departure preparation required time.

The vehicle instruction unit 15 of the parking place management server 1 determines whether the on-control time set by the on-control time setting unit 14 is reached (S104). When the on-control time is not reached (S104: NO), the vehicle instruction unit 15 repeats the determination until the on-control time is reached. On the other hand, when the on-control time is reached (S104: YES), the vehicle instruction unit 15 issues the power-on instruction for controlling the state of the autonomous vehicle 2 with which the on-control time is reached to be the power-on state (S105).

When the vehicle control unit 36 of the autonomous vehicle 2 receives the power-on instruction transmitted from the parking place management server 1, the vehicle control unit 36 controls the state of the autonomous vehicle 2 to be the power-on state (S106). After the state of the autonomous vehicle 2 is switched to the power-on state, the vehicle control unit 36 executes the departure preparation when the autonomous vehicle 2 departs for the pickup area 53 (S107). After that, at the parking space departure time, the autonomous vehicle 2 starts autonomous driving to travel from the parking space 61 to the pickup area 53 based on the traveling instruction (instruction to start leaving from the parking space) from the parking place management server 1.

As described above, the automatic parking system 100 executes the control such that the power-on state of the autonomous vehicle 2 is established prior to the parking space departure time at which the autonomous vehicle 2 departs from the parking space 61. With this configuration, the autonomous vehicle 2 can start the departure preparation prior to the parking space departure time as the power-on state of the autonomous vehicle 2 is established. Therefore, the automatic parking system 100 can suppress a delay in the departure of the autonomous vehicle 2 from the parking space departure time by causing the autonomous vehicle 2 to stand by until the departure preparation is completed, and can cause the autonomous vehicle 2 to start smoothly to travel from the parking space 61 to the pickup area 53.

Therefore, the on-control time setting unit 14 of the parking place management server 1 sets the on-control time based on the parking space departure time and the departure preparation required time. In this case, the automatic parking system 100 can appropriately set the on-control time at which the power-on state of the autonomous vehicle 2 is established based on the departure preparation required time required for the departure preparation. Accordingly, the automatic parking system 100 can cause the autonomous vehicle 2 to depart more smoothly.

Specifically, the on-control time setting unit 14 of the parking place management server 1 can set the on-control time to the time prior to the parking space departure time by the time corresponding to the departure preparation required time. In this case, the autonomous vehicle 2 can complete the departure preparation more reliably prior to the parking space departure time and can depart from the parking space 61 at the parking space departure time. Accordingly, the automatic parking system 100 can cause the autonomous vehicle 2 to depart more smoothly.

The departure preparation for the autonomous vehicle 2 to depart from the parking space includes the plurality of departure preparation items. The preparation time determination unit 34 of the autonomous vehicle 2 determines the individual preparation required time that is longest among the individual preparation required times required for preparation of the respective departure preparation items, as the departure preparation required time. In this case, even when there is the plurality of departure preparation items, the automatic parking system 100 can set the on-control time based on the individual preparation required time that is longest among the individual preparation required times of the respective departure preparation items. For example, in the case where the departure preparation items can be executed in parallel when the autonomous vehicle 2 is in the power-on state, the automatic parking system determines the longest individual preparation required time as the departure preparation required time such that extension of the departure preparation required time is suppressed and the departure preparation required time can be determined appropriately.

The preparation time determination unit 34 of the autonomous vehicle 2 can determine the total time of the individual preparation required times required for preparation of the departure preparation items as the departure preparation required time. In this case, even when there is the plurality of departure preparation items, the automatic parking system 100 can set the on-control time based on the total time of the individual preparation required times of the departure preparation items. For example, in the case where the departure preparation items cannot be executed in parallel when the autonomous vehicle 2 is in the power-on state, the automatic parking system 100 can secure the time for executing the departure preparation items individually as the departure preparation required time, which makes it possible to determine the departure preparation required time more appropriately.

Although the embodiment of the disclosure has been described above, the disclosure is not limited to the embodiment above. For example, the on-control time setting unit 14 that sets the on-control time is not limited to being provided in the parking place management server 1, and may be provided in the autonomous driving ECU 20 of the autonomous vehicle 2. The preparation time determination unit 34 that determines the departure preparation required time is not limited to being provided in the autonomous driving ECU 20, and may be provided in the parking place management server 1. The autonomous driving ECU 20 may include a scheduled departure time acquisition unit that acquires the scheduled departure time set by the user.

The configuration of the parking place 50 is not limited to the configuration shown in FIG. 2. For example, the drop-off area 52 and the pickup area 53 may be integrated into one area such as a platform.

In the departure preparation start processing described with reference to FIG. 4, the example in which the process in S101 of acquiring the scheduled departure time, the process in S102 of determining the departure preparation required time, and the process in S103 of setting the on-control time are performed in the state in which the autonomous vehicle 2 is parked in the parking space 61. The disclosure is not limited to the example above, and the processes in S101 to S103 may be executed at a timing before the autonomous vehicle 2 is parked in the parking space 61.

The on-control time setting unit 14 is not limited to setting of the on-control time based on the departure preparation time determined by the preparation time determination unit 34. For example, the on-control time setting unit 14 may set the on-control time based on the parking space departure time without using the departure preparation time. Further, the departure preparation when the autonomous vehicle 2 departs for the pickup area 53 does not need to include the plurality of departure preparation items. The departure preparation may include only one preparation item.

At least a part of the embodiment and various modifications described above may be arbitrarily combined.

What is claimed is:
1. An automatic parking system configured to cause an autonomous vehicle to travel autonomously from a parking space to a pickup area based on a parking space departure time determined such that the autonomous vehicle arrives the pickup area at a scheduled pickup time that is predetermined, the automatic parking system configured to:
 set an on-control time at which a state of the autonomous vehicle is controlled to be a power-on state based on the parking space departure time;
 set the on-control time such that the power-on state is established prior to the parking space departure time;
 control the state of the autonomous vehicle to be the power-on state based on the on-control time that is set;

execute departure preparation for the autonomous vehicle to be able to depart for the pickup area from a state in which the autonomous vehicle is parked in the parking space after controlling the state of the autonomous vehicle to be the power-on state based on the on-control time that is set, the departure preparation includes a charging processing of a backup power source for a brake; and cause the autonomous vehicle to stand by until the departure preparation is completed, and cause the autonomous vehicle to depart from the parking space to the pickup area after the departure preparation is completed.

2. The automatic parking system according to claim 1, further configured to determine a departure preparation required time required for the autonomous vehicle to perform departure preparation, wherein the on-control time is set based on the parking space departure time and the departure preparation required time.

3. The automatic parking system according to claim 2, wherein, as the on-control time, a time prior to the parking space departure time is set by a time corresponding to the departure preparation required time.

4. The automatic parking system according to claim 2, wherein:
the autonomous vehicle is configured to perform a plurality of departure preparation processing items as the departure preparation; and
the departure preparation required time is determined based on a longest individual preparation required time among individual preparation required times required for preparation of the respective departure preparation processing items.

5. The automatic parking system according to claim 2, wherein:
the autonomous vehicle is configured to perform a plurality of departure preparation processing items as the departure preparation; and
the departure preparation required time is determined based on a total time of individual preparation required times required for preparation of the respective departure preparation processing items.

6. An automatic parking system configured to cause an autonomous vehicle to travel autonomously from a parking space to a pickup area based on a parking space departure time determined such that the autonomous vehicle arrives the pickup area at a scheduled pickup time that is predetermined, the automatic parking system comprising circuitry configured to:
set an on-control time at which a state of the autonomous vehicle is controlled to be a power-on state based on the parking space departure time;
set the on-control time such that the power-on state is established prior to the parking space departure time;
control the state of the autonomous vehicle to be the power-on state based on the on-control time that is set;
execute departure preparation for the autonomous vehicle to be able to depart for the pickup area from a state in which the autonomous vehicle is parked in the parking space after controlling the state of the autonomous vehicle to be the power-on state based on the on-control time that is set, the departure preparation includes a charging processing of a backup power source for a brake; and
cause the autonomous vehicle to stand by until the departure preparation is completed, and cause the autonomous vehicle to depart from the parking space to the pickup area after the departure preparation is completed.

7. The automatic parking system according to claim 6, wherein the circuitry is configured to:
determine a departure preparation required time required for the autonomous vehicle to perform departure preparation; and
set the on-control time based on the parking space departure time and the departure preparation required time.

8. The automatic parking system according to claim 7, wherein the circuitry is configured to set, as the on-control time, a time prior to the parking space departure time by a time corresponding to the departure preparation required time.

9. The automatic parking system according to claim 7, wherein:
the autonomous vehicle is configured to perform a plurality of departure preparation processing items as the departure preparation; and
the circuitry is configured to determine the departure preparation required time based on a longest individual preparation required time among individual preparation required times required for preparation of the respective departure preparation processing items.

10. The automatic parking system according to claim 7, wherein:
the autonomous vehicle is configured to perform a plurality of departure preparation processing items as the departure preparation; and
the circuitry is configured to determine the departure preparation required time based on a total time of individual preparation required times required for preparation of the respective departure preparation processing items.

* * * * *